US012168236B2

(12) United States Patent
Ånesbug et al.

(10) Patent No.: US 12,168,236 B2
(45) Date of Patent: Dec. 17, 2024

(54) DEVICE FOR CAPTURING AND REMOVING MAGNETIC MATERIAL FROM A FLOW OF MATERIAL

(71) Applicant: JAGTECH AS, Orkanger (NO)

(72) Inventors: Geir Olav Ånesbug, Meldal (NO); Jan Egil Pallin, Heimdal (NO)

(73) Assignee: JAGTECH AS, Orkanger (NO)

( * ) Notice: Subject to any disclaimer, the term of this patent is extended or adjusted under 35 U.S.C. 154(b) by 437 days.

(21) Appl. No.: 17/626,409

(22) PCT Filed: Jul. 10, 2020

(86) PCT No.: PCT/NO2020/050194
§ 371 (c)(1),
(2) Date: Jan. 11, 2022

(87) PCT Pub. No.: WO2021/010840
PCT Pub. Date: Jan. 21, 2021

(65) Prior Publication Data

US 2022/0250086 A1 Aug. 11, 2022

(30) Foreign Application Priority Data

Jul. 12, 2019 (NO) .................................... 20190879

(51) Int. Cl.
*B03C 1/033* (2006.01)
*B03C 1/28* (2006.01)
*E21B 21/06* (2006.01)

(52) U.S. Cl.
CPC .............. *B03C 1/0332* (2013.01); *B03C 1/28* (2013.01); *B03C 1/284* (2013.01); *E21B 21/065* (2013.01);
(Continued)

(58) Field of Classification Search
CPC ......... B03C 1/0332; B03C 1/28; B03C 1/284; B03C 2201/18; B03C 2201/22; B03C 2201/28; E21B 21/065
See application file for complete search history.

(56) References Cited

U.S. PATENT DOCUMENTS 5,043,063 A 8/1991 Latimer
5,188,239 A 2/1993 Stowe
(Continued)

FOREIGN PATENT DOCUMENTS

FR 3068030 A1 12/2018
JP 2015058380 A 3/2015
(Continued)

OTHER PUBLICATIONS

International Search Report and Written Opinion dated Sep. 11, 2020 for International Patent Application No. PCT/NO2020/050194.

*Primary Examiner* — John Kim
(74) *Attorney, Agent, or Firm* — Alix, Yale & Ristas, LLP

(57) ABSTRACT

Device for capturing and removing magnetic material from a flow of material, wherein the device includes a plurality of magnet rod assemblies for capturing magnetic material in a flow of material passing the magnet rod assemblies and where the magnet rod assemblies are removably arranged to an installation plate assembly of the device, where each magnet rod assembly includes a magnet rod comprising at least two magnet segments encapsulated in a non-magnetic material, wherein the magnet rod assemblies comprise a combined attachment and wiper assembly adapted for being received and accommodated in a slot in the installation plate assembly and detachable attachment to a locking groove in the extensions of the slot.

20 Claims, 7 Drawing Sheets

(52) U.S. Cl.
CPC ...... *B03C 2201/18* (2013.01); *B03C 2201/22* (2013.01); *B03C 2201/28* (2013.01)

(56) References Cited

U.S. PATENT DOCUMENTS

| | | | |
|---|---|---|---|
| 5,819,949 | A | 10/1998 | Schaaf et al. |
| 8,132,674 | B1 | 3/2012 | Allore et al. |
| 8,360,247 | B2 | 1/2013 | Baker |
| 8,641,899 | B2 | 2/2014 | Branch |
| 2018/0078947 | A1 | 3/2018 | Pallin et al. |
| 2020/0047189 | A1 | 2/2020 | Mackenzie et al. |
| 2021/0237099 | A1 | 8/2021 | Aanesbug et al. |

FOREIGN PATENT DOCUMENTS

| | | | | |
|---|---|---|---|---|
| KR | 200438604 | Y1 | | 2/2008 |
| KR | 20110110458 | A | | 10/2011 |
| WO | WO 2009/124342 | A1 | * | 10/2009 |
| WO | WO 2016/159779 | A1 | * | 10/2016 |

* cited by examiner

DEVICE FOR CAPTURING AND REMOVING MAGNETIC MATERIAL FROM A FLOW OF MATERIAL

BACKGROUND

The disclosed embodiments are related to a device for capturing and removing magnetic material in a flow of material, and more particularly to a device providing continuous capturing of unwanted magnetic material in a flow of material, while removing magnetic material.

It is known prior art solutions related to magnetized bars that are used to remove magnetic/metal material, such as metal cuttings, metal shavings, metal parts, and the like, in a flow of material, such as in a fluid stream of oil well drilling mud or flow of raw material. It is further known methods and apparatus for removing metal cuttings, metal shavings, metal parts captured by the magnetized bars by the use of a non-magnetic wiper assembly arranged slidable upon the magnetized bar between the ends thereof for removal of the captured magnetic metal from the magnetized bar. Many of the magnetic metal parts that are collected by the magnetized bars, also known as ditch magnets, are pieces that have been cut or shaved and are thus of irregular shape and can have sharp edges/points, or the like. Metal cuttings and fines increase the wear and tear on equipment downstream the system. Safety is very important and meaningful in such operations including personnel handling equipment like this, especially in the oil and gas industry. Cuttings that are collected by a ditch magnet can include sharp edged debris that could possibly cut the hand of a worker who handles the ditch magnet. Reducing maintenance costs and increased lifetime of downstream equipment is also preferred. Magnetic fines and particles in the drilling fluid also interrupt the logging in directional drilling by shielding of the navigation compass at the drilling bit during directional drilling, especially close to the earth magnetic north and south pole.

Cuttings that have been retrieved from a ditch magnet can provide information that is beneficial to oil and gas well operators. These collected cuttings may indicate casing wear during ordinary drilling operations, pipe wear, or any other factor which could be used for economic or maintenance considerations.

In other industrial plants the supply of raw material includes unwanted microscopic foreign metal material or foreign metal bodies, in the form of metal fragments, screws, washers, or the like. Such unwanted metallic foreign contaminants are referred to as “tramp metals” in the industry. The presence of these metallic contaminants in the raw materials being processed in product-forming machines are undesirable for a variety of reasons. Contaminants may cause damage on industrial machine or render the finished part unusable or the presence of metal in the product may cause unacceptable structural, visual, or magnetic aberrations in the finished part.

Further, in the food industry, fish food industry or animal food industry also such equipment is favourable to use to detect unwanted metal material in the products.

Accordingly, the need for a device for removing unwanted magnetic metal material from a flow of material in many different areas, such as in oil well drilling mud, product-forming machines, granular handling equipment, and other plants (such as food) or processes where there is needed to remove magnetic metal material from a flow of material.

Different solutions have been proposed for providing methods and apparatus which are arranged for capturing unwanted magnetic metal material in a flow of material, and which at the same time should be easy to clean and simple to operate, which solutions will be discussed below.

U.S. Pat. No. 5,043,063 (Michael W. Latimer) discloses a magnetic trap made up of a hollow, generally cylindrical body, having an open top, an inlet and an outlet for connecting to a flow line for liquid containing entrained removable magnetic material. There is a removable cover for the hollow body, a plate is supported on the cover, and elongated, spaced non-magnetic tubes are fixed to the cover. Elongated stacks of permanent magnets are attached to the plate and extend through the cover into the tubes. When magnetic material held to the tubes by the magnets is to be removed, the cover can be removed from the body, the magnetic stacks can be pulled out of the non-magnetic tubes with the plate, thereby removing the magnetic fields from the tubes so that the magnetic material held to the tubes falls off of the tubes, thereby cleaning the tubes.

From U.S. Pat. No. 5,188,239 (Michael W. Stowe) it is disclosed a tramp metal separation device adapted to be removably inserted into a housing which directs pelletized raw material to an industrial machine and to separate tramp metal contaminants therefrom. A drawer frame having an outer face plate with a plurality of openings disposed therethrough is adapted to be removably inserted into the housing. A plurality of cylindrical magnets, adapted to be inserted through the plurality of openings in the outer face plate, is secured to a drawer plate. Described is also a plurality of silicon-based O-rings that may be disposed in grooves on the inner surface of the openings so as to form a wiper mechanism to aid in removing particles from the magnets.

U.S. Pat. No. 8,641,899 (James A. Branch) describes a method and apparatus for removing metal cuttings from an oil well drilling mud stream which provides a magnetic body or “ditch magnet” having end plates that extend radially and circumferentially from the magnetic body, the plates being positioned at end portions of the magnetic body. A third plate in the form of a wiper is used to dislodge metal cuttings and other metallic material from the magnetic body after the magnetic body has accumulated such metallic parts. One of the end plates can be removable to facilitate a complete scraping or wiping of the metallic parts from the metallic body by the wiper plate.

The above-mentioned solutions suffer from that they will not provide a continues capturing of unwanted metal material, as the flow of material will need to be stopped at the time of cleaning of magnetic material in the magnets or the flow of material will be left without magnets at the time of cleaning. In e.g. a drilling operation there will be sufficient costs with stopping the drilling while the magnets are cleaned for metal material. Continuing the flow of material while the magnets are cleaned is usually not an option as this will result in that equipment could be damaged due there is no capturing of magnetic material.

There exist some solutions is arranged for continuous capturing, which will be discussed below.

WO 2009124342 describes magnetic separation apparatus for separating magnetic materials from non-magnetic materials in a material flow comprising self-cleaning magnetic separators comprising: a cylinder having a first end closer to a material flow than its second end in use, a piston slidingly mounted within the cylinder, and a magnetic shaft extending from the piston, the piston and cylinder adapted to move the magnetic shaft between an extended position and a retracted position, such that in the extended position, at least a sleeveless portion of an outer surface of the magnetic shaft is exposed to the material flow and in the retracted position the magnetic portion is retracted substantially or wholly within the cylinder, the apparatus including a protected shaft wiper and shaft seal; within the first end of the cylinder for removing extracted magnetics. Accordingly, it is described an automatic solution where a piston and cylinder are used for retracting the magnetic shaft, which will be both complex and expensive to install and maintain. Further, it will not be suitable for use in capturing and removing metal cuttings from an oil well drilling mud stream onshore or offshore due to the harsh environment. This solution will also have a problem getting rid of the collected material. Further, the magnetic shafts are arranged in parallel in width direction and in the longitudinal direction, which will not be the most effective manner for capturing metal cuttings.

U.S. Pat. No. 8,132,674 B1 describes a device for magnetic separation of tramp metal, which consists of a first and a second housing. The first housing has an inlet and an outlet, a first drawer and a second drawer. Each of the drawers has a plurality of magnets and a wiper assembly for each of the magnets. The drawers are supported with respect to the first housing such that each of the drawer is moveable between an extended position and a retracted position. In the extended position, the magnets of the respective drawer are positioned within the first housing and are adapted to be in contact with the stream of raw materials. In the retracted position, the magnets of the respective drawer are positioned outside of the first housing. The drawers move independently of each other and the device is so constructed that one set of magnets is always 5 in contact with the fluid, which requires cleaning. This solution also suffers from the disadvantages as mentioned above for WO 2009124342, but in addition this solution is arranged for arranging the magnets in the horizontal plane, which would be a severe problem if used in oil well drilling mud stream onshore or offshore, and would require complex sealing means to avoid mud from leaving when a magnet is drawn out for cleaning.

WO 2009124342 A1 describes a device for capturing and removing magnetic material from a flow of material, wherein the device includes magnet assemblies including magnet rods for capturing magnetic material in a flow of material passing the magnet assemblies and where the magnet assemblies are removably arranged to a frame assembly of the device, wherein each magnet assembly includes at least two magnet rods and that the device includes at least two rows of magnet assemblies for enabling continuous capturing of magnetic material. This solution has the disadvantage in weight for manual handling due to the combination of two magnet rods mounted together. The solution also has the disadvantage that it needs a customized assembly frame for each installation and is not flexible regarding the geometry of the installation area neither in height or width of the cross section.

A further disadvantage with the two latter solutions is that they would need to be sufficiently displaced from each other to ensure that the magnetic force of each magnet does not affect an adjacent magnet, as this will result in problems with withdrawing the magnets in an automated manner.

Another disadvantage with the latter solutions is that the use of automatic control will considerably increase the space needed for installation and use of the solutions.

A further solution that solves many of the drawbacks of the mentioned prior art solutions, and which is the closest prior art of the present invention, is WO2016159779 A1, with the same inventors as the present invention. In WO2016159779 A1 is disclosed a device for capturing and removing magnetic material from a flow of material, wherein the device includes magnet assemblies including magnet rods for capturing magnetic material in a flow of material passing the magnet assemblies and where the magnet assemblies are removably arranged to a frame assembly of the device, wherein each magnet assembly includes a set of at least two magnet rods.

A drawback of all prior art solutions is that the magnet rods are not individually adjustable in relation to the material of flow.

SUMMARY

The main object of the present invention is to provide a device for capturing and removing magnetic material in a flow of material which solves the above-mentioned drawbacks of prior art.

A further object of the present invention is to provide a device for capturing and removing magnetic material in a flow of material which provides continuous collection of magnetic materials while removing and cleaning.

An object of the present invention is to provide a device for capturing and removing magnetic material in a flow of material where a plurality of magnet rod assemblies are arranged in a pattern to provide a magnet grid providing the best possible magnetic field over the area which the material is flowing through the device.

Another object of the present invention is to provide a device for capturing and removing magnetic material in a flow of material where the plurality of magnet rod assemblies is arranged to an installation plate to form a magnet grid.

It is an object of the present invention to provide a magnet assembly where the separate magnet rod assemblies are arranged for detachable arrangement to an installation plate with predefined mounting slots to optimize the magnet grid and for easy insertion and removing of the magnet rods from the device.

It is further an object of the present invention to provide a device for capturing and removing magnetic material in a flow of material to obtain an easy, cost efficient and interchangeable installation of the assembly regardless the geometry of the installation site/launder.

An object of the present invention is to provide a device for capturing and removing magnetic material in a flow of material which provides efficient and safe mounting and dismounting of the magnet rod assemblies for personnel during continuous flow of material (production), so that one does not need to stop the flow of material (production) during cleaning of the magnet rod assemblies for captured metal material.

It is further an object of the present invention to provide a device for capturing and removing magnetic material in a flow of material which has low weight, small dimensions and can be handled in an easy way by a single person and which satisfies the requirements of HES (Health, Environment and Safety).

It is further an object of the present invention to provide a device for capturing and removing magnetic material in a flow of material which satisfies the requirements of explosion hazard environment.

An object of the present invention is to provide a device for capturing and removing magnetic material in a flow of material which can easily be adapted to new and existing system, and at the same time be space saving.

An object of the present invention is to provide a device for capturing and removing magnetic material in a flow of material with an integrated cleaning system based on standard machine elements to reduce maintenance cost.

An object of the present invention is to provide a device for capturing and removing magnetic material in a flow of material with the highest surface magnetic flux density on the magnet rod surface.

An object of the present invention is to provide a device for capturing and removing magnetic material in a flow of material with fast and easy detachment, cleaning and attachment cycle to reduce the time with reduced cleaning capacity.

An object of the present invention is to provide a device for capturing and removing magnetic material in a flow of material with magnetic rod assemblies that can be placed in any of the slots, interchangeably on the installation plate assembly.

An object of the present invention is to provide a device for capturing and removing magnetic material in a flow of material with magnetic rod assemblies with standard length with no need for customisation of additional deliveries, reducing order and delivery time for spare magnetitic rod assemblies.

Further objects of the present invention will appear from considering the following description, drawings and claims.

A device for capturing and removing magnetic material from a flow of material according to the present invention is described in claim 1. Preferable features of the device are described in the dependent claims.

A device for capturing and removing magnetic material from a flow of material, according to the present invention includes a plurality of separate magnet rod assemblies arranged together in predefined mounting slots of an installation plate assembly creating a magnetic pattern.

Flow of material does herein mean a material in a condition able to flow through the device according to the present invention, such as fluids, raw material and so on.

The magnet rod assemblies comprise a magnet rod enclosed in a non-magnetic material, such as a sleeve or an encapsulating non-magnetic material, as well known for a skilled person.

The magnet rod assembly is further provided with non-magnetic end areas of the magnet rods. The magnet rods can include permanent magnets, electromagnets or controllable magnets, depending on the area of use. In e.g. explosion hazard areas where there are possibilities for gas being present, such as on offshore installations, permanent magnet rods will be used to avoid possibilities for sparks which could set gas on fire.

The magnet rod assemblies are further provided with a magnet handle device arranged at upper end of the magnet rod for easy carrying and handling.

The magnet rod assemblies further comprise a combined attachment and wiper assembly arranged for detachable arrangement of the magnet rod assemblies to the installation plate assembly for easy mounting, cleaning, carrying and handling. The combined attachment and wiper assembly is formed by a main body enclosing the magnet rod and further housing wipers and a sliding bearing, which main body is movably arranged in longitudinal direction of the magnet rod, between upper and lower wiper stop elements, and movable in circumferential direction of the magnet rod for detachable attachment to the installation plate assembly.

The main body of the combined attachment and wiper assembly is further provided with a circumferentially extending recess adapted for being received and accommodated in the mentioned mounting slots of the installation plate assembly, and a fixation element for detachable attachment to the installation plate assembly via locking grooves arranged in the extension of the mentioned slots in the installation plate assembly.

The combined attachment and wiper assembly is further provided with at least two non-magnetic metal wipers as well as a handle for movement of the combined attachment and wiper assembly in relation to the magnet rod for cleaning in both axial directions and attachment or detachment to the installation plate assembly.

The installation plate assembly according to the present invention further comprises an installation plate wherein the slots and locking groves are arranged for arrangement of the mentioned magnet rod assemblies to form a defined magnet grid. The installation plate assembly further comprises fixation means for attaching the installation plate, and thus the device according to the present invention, to a structure on the installation site, enabling easy and flexible installation on site.

Depending on how many magnet rod assemblies to be arranged in the transversal direction of the installation plate assembly, the installation plate assembly will be provided with slots arranged such that the magnet rod assemblies are evenly distributed over the cross-sectional area, which defines the area where the material flows through the device according to the present invention.

The combined attachment and wiper assembly due to being capable of moving in longitudinal direction of the magnet rod enables the movement of the magnet rod assemblies in vertical plane in relation to the installation plate assembly for horizontal adjustment for distributing magnetic field over the whole height of the cross-sectional area, which defines the area where the material flows through the device according to the present invention.

Accordingly, the magnet rod assemblies and the installation plate assembly together form a module for the device. The device can thus easily be adapted to include several modules like this, and where the device may comprise two or more modules like this arranged in series.

The small diameter of the magnet rod assemblies, together with the calculated pattern of magnet rods decreases the speed of flow through the magnetic grid, without significantly increasing the pressure drop through the device.

According to the present invention the installation plate assembly is adapted for arrangement of a plurality of magnet rod assemblies, arranged in rows, positioned in series in the flow direction to provide at least two separate rows of magnet rod assemblies, seen in the material flow direction. By this is achieved that one can clean the first row or second row etc. while the other row of magnet assemblies continuously performs capturing of magnetic material. By this is achieved that there will be no need for stopping the material flow or leaving the material flow unprotected when cleaning. By the present invention is further achieved a device where the magnet rod assemblies are easy to remove and insert. When there is a need for cleaning, the separate magnet rod assembly can easily be removed from the installation plate assembly while remaining rows of magnet rod assemblies continue the capturing of magnetic material. By means of the device including a combined attachment and wiper assembly, the captured magnetic material can easily be removed by moving the combined attachment and wiper assembly, when the magnet rod assemblies is removed from the installation plate assembly, by using the handle thereof to move the combined attachment and wiper assembly in longitudinal direction of the magnet rod between the upper wiper stop element and lower wiper stop element. As the magnet rods at the lower end are free of magnets, total removal of the magnetic material is achieved in an easy and fast way. After the cleaning process is performed, the magnet rod assembly again is inserted into the installation plate assembly, whereupon the next magnet rod assembly can be cleaned within a minimum of time.

Depending of the application the flow velocity of the material can be reduced or increased in front of the device according to the present invention.

According the present invention one can also arrange means in front of the device for measuring the material level, which could be used to detect when the magnet assemblies should be cleaned.

When the material level has increased above a certain level, this will indicate that the material flow through the device is low and that the magnet assemblies should be cleaned.

According to the present invention the magnet assemblies can include permanent magnet rods, electromagnet or controllable magnet rods which can be switched on and off, or even controllable magnet rods where one can control the properties/effect thereof by means of a control device arranged for this.

Further preferable features and details of the present invention will appear from the following example description.

BRIEF DESCRIPTION OF THE DRAWINGS

The present invention will below be described in further detail with reference to the attached drawings, where.

DETAILED DESCRIPTION

Figure 1:
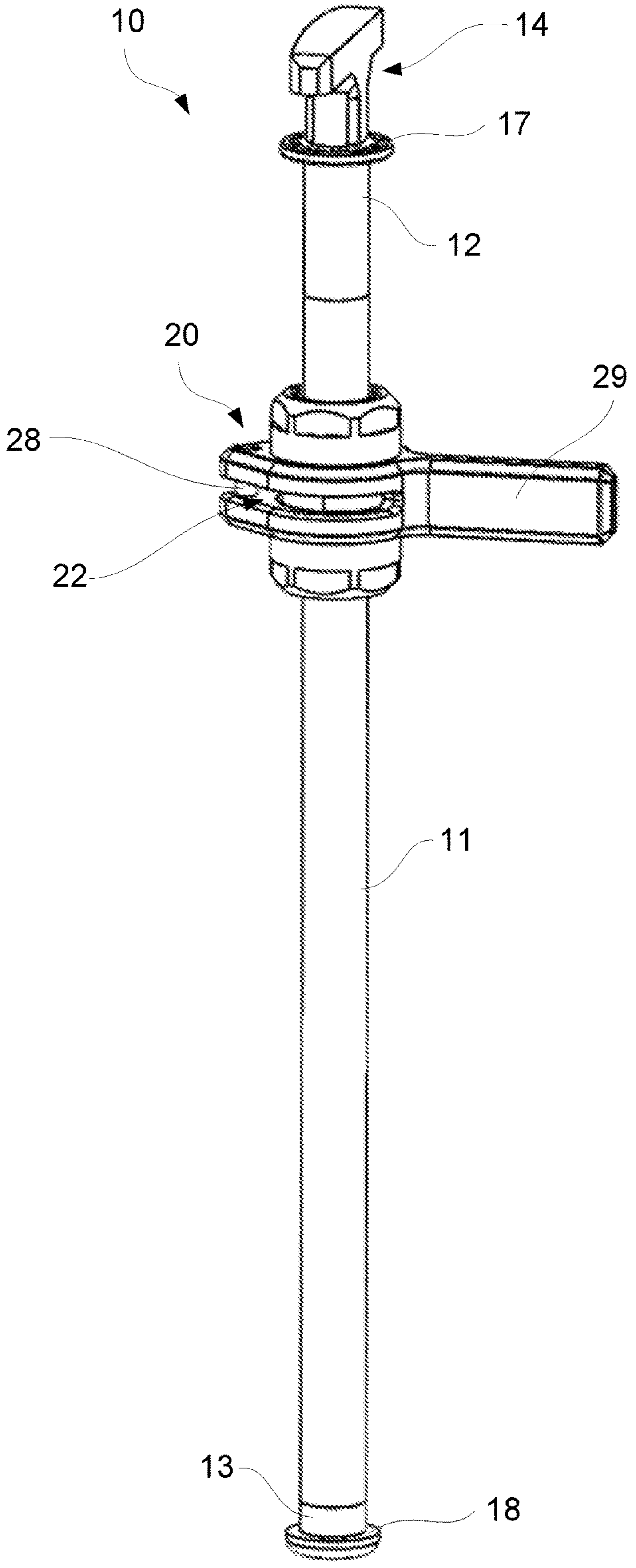
FIG. 1 is a principle drawings of magnet rod assembly according to the present invention.
Figure 2:
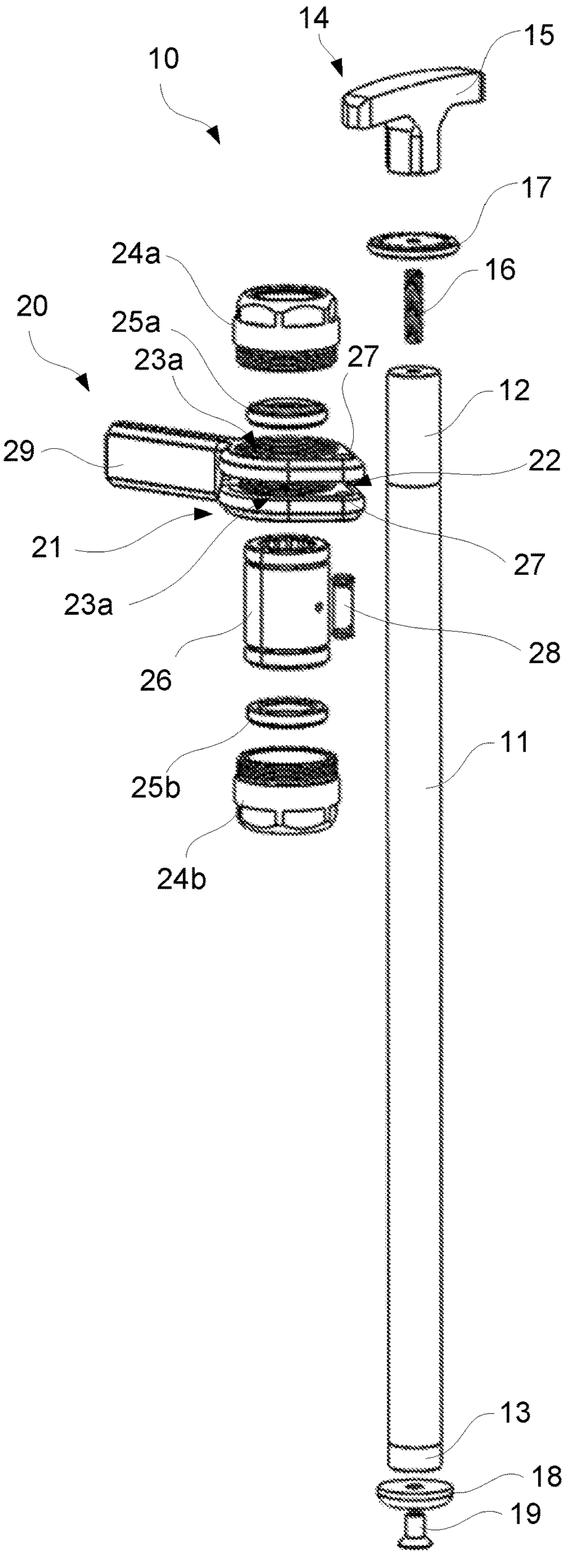
FIG. 2 is an exploded view of the magnet rod assembly in FIG. 1.

Reference is now made to FIGS. 1 and 2 showing principle drawings of a magnet rod assembly 10 for a device 100 according to the present invention, where FIG. 2 is an exploded view showing further details. The magnet rod assembly 10 comprises a magnet rod 11 according to the example of the present invention includes at least two magnet segments 11*a* (FIGS. 5A and 5B) in the form of permanent magnets, enclosed in a non-magnetic sleeve or material, and where upper 12 and lower 13 ends thereof do not contain magnets. Even if permanent magnet rods 11 hereafter will be used as the example, this does not limit the invention as also other magnet segments or magnetic field generators can be used, such as controllable magnet rods or electromagnetic rods.

The permanent magnet rod assembly 10 are at upper end provided with a magnet handle device 14 formed by a handle 15 attached to the upper end 12 of the magnet rod 11 by means of a threaded bolt 16 and threaded holes in the upper end of the magnet rod 111 and in lower end of the handle 15.

The permanent magnet assembly 10 is further at upper and lower ends provided with upper 17 and lower 18 wiper stop elements arranged to the ends of the magnet rod 11. In the shown embodiment the upper wiper stop element 17 is formed by a disc provided with a centrally through hole, arranged and fixed between the handle 15 and the upper end 12 of the magnet rod 11, and the lower wiper stop element 18 is formed by a disc-shaped end knob arranged at lower end of the magnet rod 11 and fixed thereto by means of a threaded bolt 19 and a threaded hole in the lower end 13 of the magnet rod 11. The upper 17 and lower 18 wiper stop element will be of a suitable non-magnetic material and have a larger exterior diameter than the magnet rod 11. In an alternative embodiment the upper wiper stop element 17 is integrated with the handle 15.

The upper wiper stop element 17 may further be arranged to provide identification for the magnet rod assembly 10 either by visual identification means, such that an identification number is engraved into the disc 17, or by communicating identification means, such as an RFID-chip integrated into the disc 17. The upper wiper stop element 17 may further be provided with hazard information for the magnet rod assembly 10.

The magnet rod assembly 10 is further provided with a combined attachment and wiper assembly 20 arranged for detachable arrangement of the magnet rod assemblies to an installation plate assembly 30 (FIG. 3) for easy mounting, cleaning, carrying and handling. The combined attachment and wiper assembly 20 is formed by a main body 21 enclosing the magnet rod 11, which combined attachment and wiper assembly is movably arranged to the magnet rod 11, in longitudinal direction of the magnet rod 11 between the upper 17 and lower 18 wiper stop element, as well as in circumferential direction of the magnet rod 11 for detachable attachment to the installation plate assembly 30.

The main body 21, in the shown embodiment, has a mainly elliptic shape, but are not restricted to an elliptic shape (may be rectangular, circular, quadratic, etc.) and is provided with circumferentially extending recess 22 at one side thereof, adapted the thickness of the installation plate assembly 30, further described below. The upper and lower surface of the main body 21 is further provided with threaded through holes 23*a-b* for accommodating and fixation of upper 24*a* and lower 24*b* threaded sleeves, respectively.

According to the present invention the combined attachment and wiper assembly 20 comprises at least one metal wiper 25*a-b*. In the shown embodiment there are arranged two non-magnetic metal wipers 25*a-b*. The threaded sleeves 24*a-b* are adapted for accommodating and fixation of upper 25*a* and lower 25*b* metal wipers of non-magnetic material, which metal wipers 25*a-b* having a central opening adapted to outer surface of the permanent magnet rods 11. The upper 25*a* and lower 25*b* metal wipers are spaced apart in longitudinal direction of the magnet rods 11 and thus in the main body 21 by means of a sliding bearing 26 of non-magnetic material with an interior diameter adapted the exterior diameter of the permanent magnet rods 11 and an exterior diameter adapted the through holes 23*a-b* of the main body 21 and interior diameter of the threaded sleeves 24*a-b*. The sliding bearing 26 and metal wipers 25*a-b* are locked in place to the main body 21 by the threaded sleeves 24*a-b* being provided with a restriction such that when the threaded sleeves 24*a-b* are attached to the main body 21 the sliding bearing 26 and metal wipers 25*a-b* are locked in relation to the main body 21.

The main body 21 is further at the end with the circumferentially extending recess 22 provided with through holes 27 adapted for accommodation and fixation of a fixation element 28, such as a spring pin, bolt or similar, extending over the circumferentially extending recess between the through holes 27, which fixation element 28 will be used for guiding and locking of the magnet rod assembly 10 into detachable attachment with dedicated position slots 32 of the installation plate assembly 30, further described below.

The main body 21 is further at the opposite end of the fixation element 28 provided with a handle 29 for movement of the combined attachment and wiper assembly 20 in longitudinal direction of the magnet rod 11 for cleaning and in circumferential direction of the magnet rod 11 for detachable attachment to the installation plate assembly 30.

Figure 3:
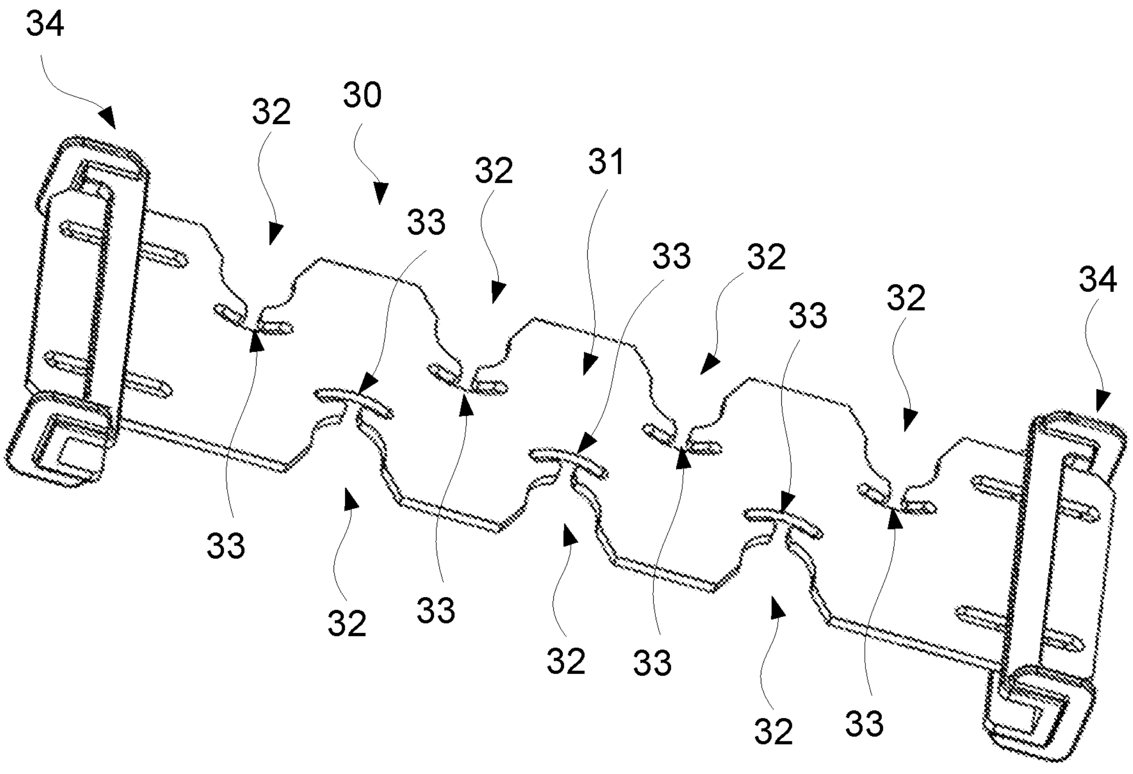
FIG. 3 is a principle drawing of a installation plate assembly according to the present invention for a plurality of the magnet assemblies in FIG. 1.

Reference is now made to FIG. 3 which is a principle drawing of an installation plate assembly 30 for the magnet rod assemblies 10 shown in FIGS. 1 and 2. The installation plate assembly 30 is formed by installation plate 31 with machined slots 32 at longitudinal sides thereof adapted for receiving and accommodating the combined attachment and wiper assembly 20 of the magnet rod assemblies 10, wherein the machined slots 32 end in T-shaped locking grooves 33 adapted for receiving and accommodating the fixation element 28 of the combined attachment and wiper assembly 20 of the magnet rod assemblies 10. As shown in the figure it will preferable that the T-shaped locking groves 33 are curved to achieve a secure locking of the combined attachment and wiper assembly 20.

The slots 32 and T-shaped locking grooves 33 are arranged with a predefined distance apart both diagonally and transverse of the installation plate 31 to achieve a desired magnetic grid, further explained below.

Figure 4:
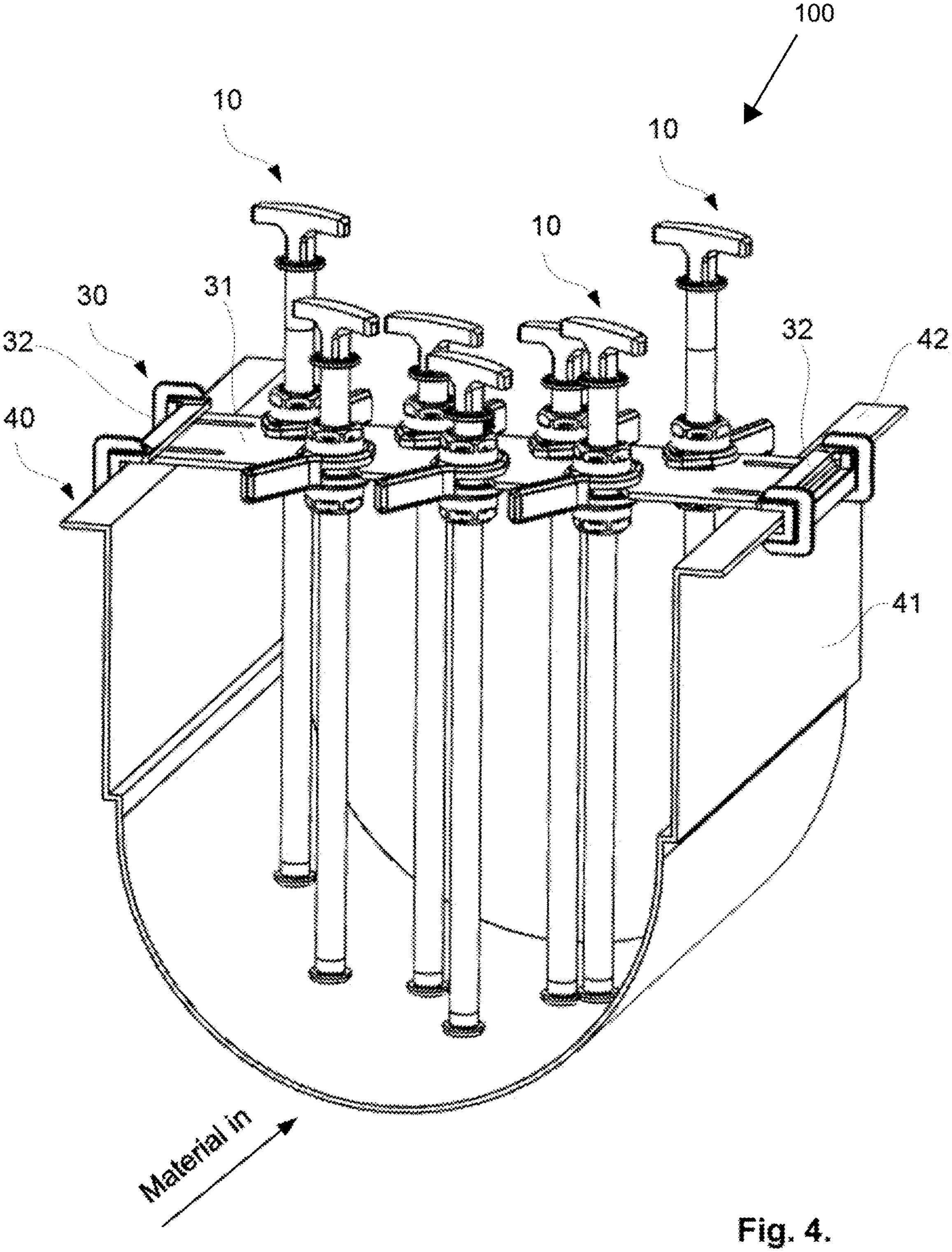
FIG. 4 is a principle drawing of a complete device according to the present invention arranged to a structure wherein material flow.

The length of the installation plate 31 may be delivered in standard lengths further to be cut to the width of the installation area by customer if necessary. The installation plate assembly 30 further comprises fixation means 34, in the shown embodiment in the form of two clamps, for fixation of the installation plate assembly 30 to a structure 40 wherein a flow of material is flowing. An example of such a structure is shown in FIG. 4, where the structure 40 is formed by a flow channel 41 provided with longitudinally extending flanges 42, to which longitudinally extending flanges 42 the installation plate assembly 30 is attached by means of the fixation means 34. By e.g. using bolts or similar the installation plate assembly 30 is fixed to the structure 40.

According to a further embodiment of the present invention the fixation means 34 are preferably arranged for transverse adjustment of the installation plate 31 in relation to width of the structure 40 by allowing the installation plate 31 to pass through the fixation means 34, as well as being provided with longitudinally extending slots for adapted arrangement of bolts or similar. This will make the installation plate assembly 30 easily adjustable according to various installation places.

Reference is now made to FIG. 4 which is a principle drawing of a complete device 100 according to the present invention arranged to a structure 40 for capturing and removing magnetic material from a flow of material in the structure 40. In the shown example, there are shown seven magnet rod assemblies 10, but the number of magnet rod assemblies 10 may be from at least one per row and upwards, depending on the width of the structure 40.

As can be seen in FIG. 4, due to the magnet rod 11 of the magnet rod assemblies 10 are movable in longitudinal direction in relation to the installation plate assembly 30, each magnet rod 11 is vertically adjustable to fit the shape of the structure 40/installation site. As shown in FIG. 4, the structure 40 has a curved bottom, requiring that the magnet rods 11 are vertically adjusted at the sides compared to the center of the structure 40.

Figure 5A:
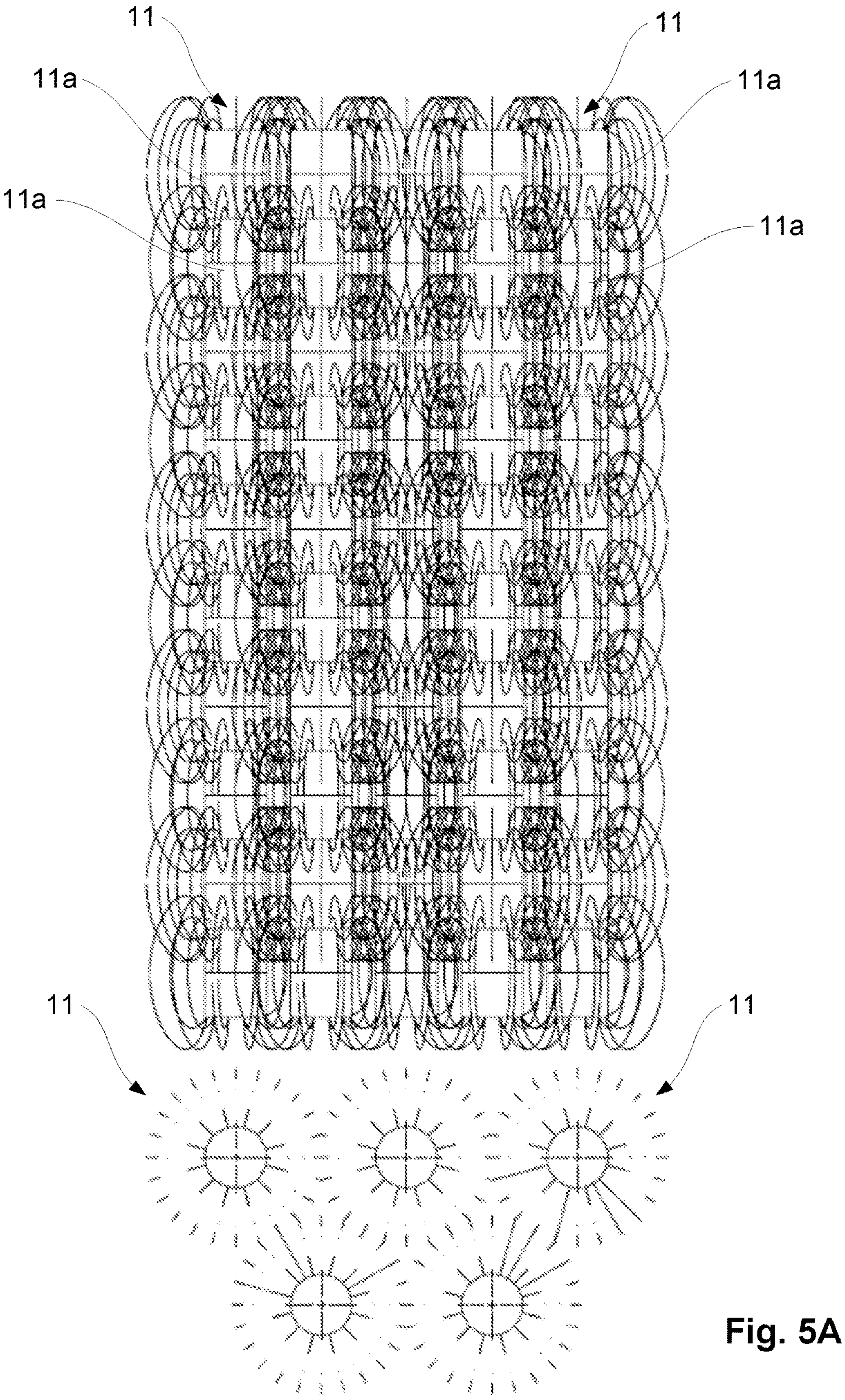
FIGS. 5A-5C are principle drawings of magnet rods containing magnet segments, as well as showing magnetic field created thereby.
Figure 5B:
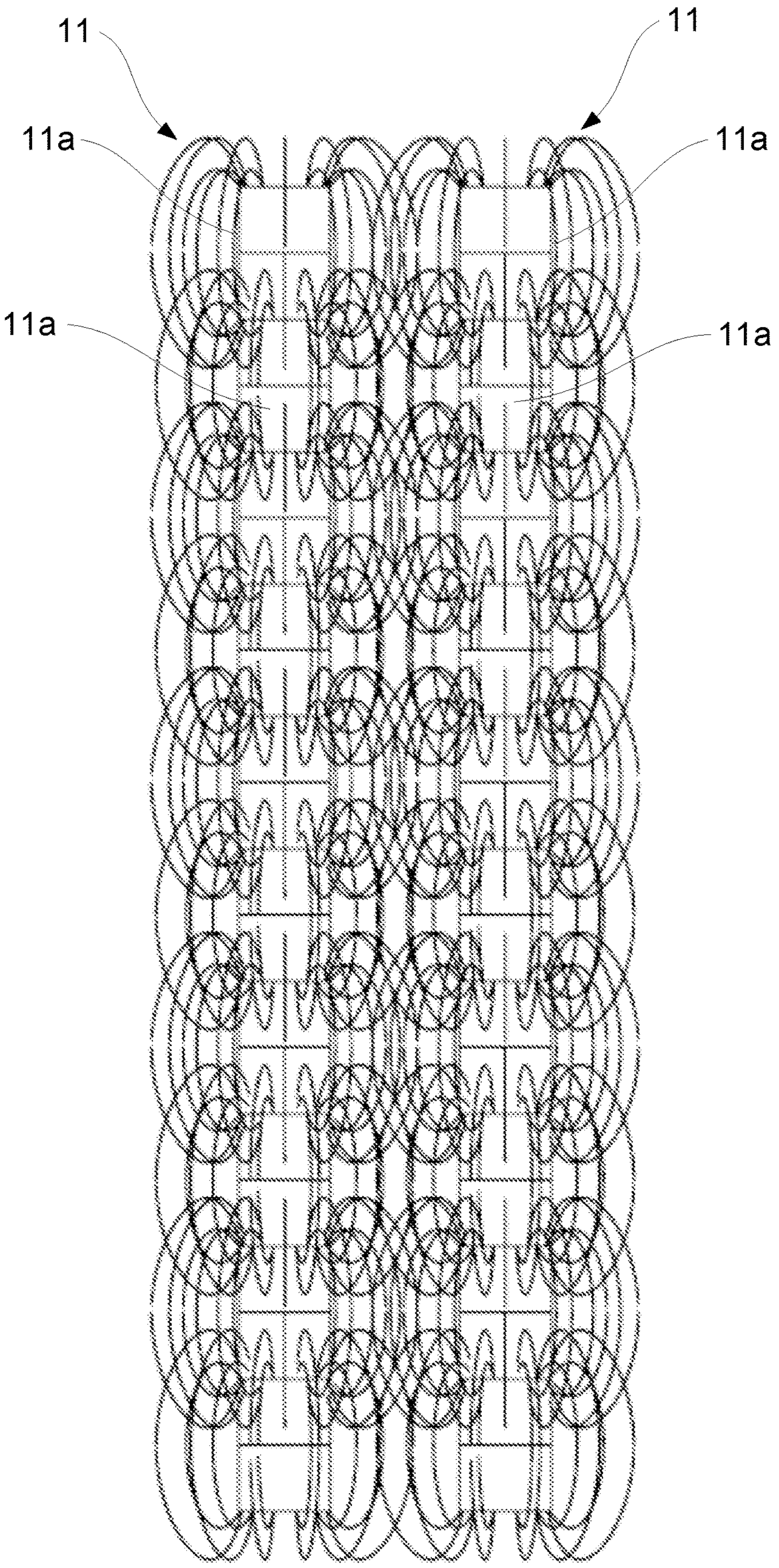
Figure 5C:
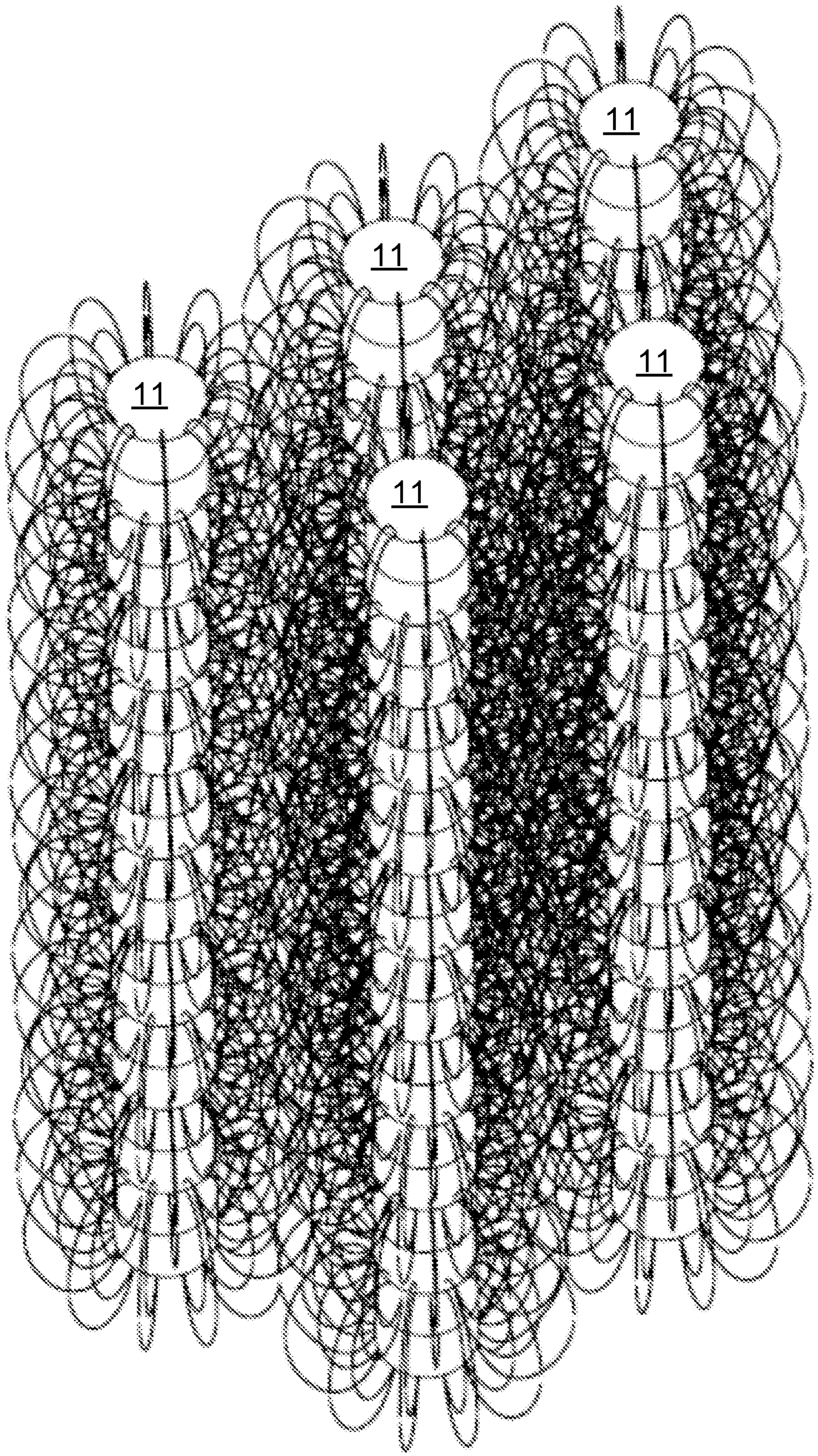

In FIGS. 5A-5C there are shown five neighbouring magnet rod assemblies 10 arranged in two rows, wherein the magnet rod assemblies 10 are spaced apart in transversal direction and longitudinal direction the flow direction in relation to the other magnet rod assemblies 10. In this way, the mentioned magnet rod assemblies 10 form a magnetic grid with an extension both in the horizontal and vertical plane. As can be seen from the magnetic field lines in the figures the magnet rod assemblies 10 create magnetic fields therebetween.

By the device according to the present invention it is provided a device 100 being easily scalable both vertically and transversal, which can be adapted and arranged in a material flow line where material flows where it is desired to remove unwanted magnetic metal material from the flow of material.

The device according to the present invention provides a solution that is flexible in relation to the geometry of the installation area in both height and width.

By that the device 100 according to the present invention preferably includes at least two rows of magnet rod assemblies 10, as seen in FIG. 4, where there are three magnet rod assemblies 10 in the first row and four magnet rod assemblies 10 in the second row, is achieved a solution where the operation can be continued, i.e. the flow of material do not need to be stopped during cleaning/removing of magnetic material from the magnet rod assemblies 10 as the first row can be cleaned while the second row continues to capture unwanted magnetic metal material.

It is further achieved a device 100 where the magnet rod assemblies are easily insertable and removable from the installation plate assembly 30 by means of the guiding of the combined attachment and wiper assembly 20 in the machined slots 32/T-shaped locking recesses 33 of the installation plate assembly 30 which ensures correct insertion and removing of the magnet rod assemblies 10. When the combined attachment and wiper assembly 20 are rotated in any direction the fixation element 28 of the combined attachment and wiper assembly 20 will lock into the installation plate assembly 30, securely attaching the magnet rod assemblies 10 to the installation plate assembly 30.

It is further achieved a device 100 where the magnet rod assemblies 10 are easy handable due to the light weight, low height and limited number of magnet rods which make them handable for a single person. By this, the low weight requirements according to HES (Health, Environment and Safety) are fulfilled. It is further an advantage that the magnet rod assemblies 10 are provided with two handles 15 and 29, making them easy handable.

By that the permanent magnet assemblies 10 are provided with a wiper assembly, the captured unwanted magnetic metal material can easily be removed from the magnet rod assemblies 10 by a single person moving the combined attachment and wiper assembly 20 in longitudinal direction of the magnet rods 11.

The present invention is especially suitable for capturing and removing metal cuttings from an oil well drilling fluid stream onshore or offshore, magnetic metal material in a flow of raw material, process lines in food industry (animal, fish and human food) and also recovery or recycling plants, etc.

The invention claimed is:

1. A device (100) for capturing and removing magnetic material from a flow of material, comprising a plurality of magnet rod assemblies (10) for capturing magnetic material in a flow of material passing the magnet rod assemblies (10), the magnet rod assemblies (10) being removably arranged to an installation plate assembly (30) of the device (100), each magnet rod assembly (10) including a magnet rod (11) comprising at least two magnet segments (11*a*) encapsulated in a non-magnetic material, wherein the magnet rod assemblies (10) comprise a combined attachment and wiper assembly (20) configured to be received and accommodated in a slot (32) in the installation plate assembly (30) and to be detachably attached to a locking groove (33) in the extensions of the slot (32).

2. The device (100) according to claim 1, wherein the combined attachment and wiper assembly (20) is arranged movable in a longitudinal and circumferential direction of the magnet rod (11) of the magnet rod assembly (10).

3. The device (100) according to claim 2, wherein the combined attachment and wiper assembly (20) is provided with a circumferentially extending recess (27) for engagement with the slot (32) of the installation plate assembly (30).

4. The device (100) according to claim 2, wherein the installation plate assembly (30) comprises an installation plate (31) provided with numerous slots (32) at longitudinal sides terminating in T-shaped locking grooves (33).

5. The device (100) according to claim 4, wherein the slots (32) and T-shaped locking grooves (33) are arranged a predefined distance apart both diagonally and transverse of the installation plate (31).

6. The device (100) according to claim 5, wherein the slots (32) are arranged to provide a calculated predefined pattern with given distances between slots (32) for obtaining desired placement of the magnet rod assemblies (10) for a defined magnetic density flux grid in cross-section of the device (100).

7. The device (100) according to claim 1, wherein the combined attachment and wiper assembly (20) is provided with a circumferentially extending recess (27) for engagement with the slot (32) of the installation plate assembly (30).

8. The device (100) according to claim 1, wherein the combined attachment and wiper assembly (20) is provided with a fixation element (28) at one end for engagement with the locking groove (33).

9. The device (100) according to claim 1, wherein the installation plate assembly (30) comprises an installation plate (31) provided with numerous slots (32) at longitudinal sides terminating in T-shaped locking grooves (33).

10. The device (100) according to claim 9, wherein the slots (32) and T-shaped locking grooves (33) are arranged a predefined distance apart both diagonally and transverse of the installation plate (31).

11. The device (100) according to claim 10, wherein the slots (32) are arranged to provide a calculated predefined pattern with given distances between slots (32) for obtaining desired placement of the magnet rod assemblies (10) for a defined magnetic density flux grid in cross-section of the device (100).

12. The device (100) according to claim 9, wherein the installation plate assembly (30) comprises fixation means (34) adapted for flexible adjustment and fixation of the installation plate (31) transverse of the flow direction regardless of a width dimension of a structure (40) in which material is flowing at an installation site.

13. The device (100) according to claim 1, wherein the combined attachment and wiper assembly (20) is provided with a handle (29) at one end.

14. The device (100) according to claim 1, wherein the combined attachment and wiper assembly (20) is provided with at least two non-magnetic metal wiper (25*a*-*b*).

15. The device (100) according to claim 1, wherein the combined attachment and wiper assembly (20) comprises upper (17) and lower (18) wiper stop elements arranged at upper and lower ends of the magnet rod (11), respectively.

16. The device (100) according to claim 1, wherein the device (100) includes at least two rows of magnet rod assemblies (10) for continuous capture of magnetic material, wherein the at least two magnet rod assemblies (10) are arranged displaced both in longitudinal direction and transversal direction in relation to each other and in relation to a flow direction of the material, thereby creating a cross web of magnetic field on both the horizontal and vertical section between magnet rod assemblies (10) of the device (100).

17. The device (100) according to claim 1, wherein, when attached to the installation plate assembly (30), the magnet rod (11) of the magnet rod assemblies (10) is adjustable in a longitudinal direction to obtain full magnet rod (11) contact between fluid and magnetic surface in full height of the cross-section at a structure (40) in which material is flowing at an installation site.

18. The device according to claim 1, wherein the magnet rods (11) include non-magnetic end areas (12, 13).

19. The device according to claim 1, wherein the magnet rods (11) include permanent magnets, controllable magnets or electromagnets.

20. The device according to claim 1, wherein the magnet rod assemblies (10) comprise a magnet handle device (14) attached to an upper end (12) of the magnet rod (11).

* * * * *